Aug. 25, 1925.
T. E. STURTEVANT
VALVE MECHANISM
Filed Aug. 5, 1921
1,550,756
2 Sheets-Sheet 1
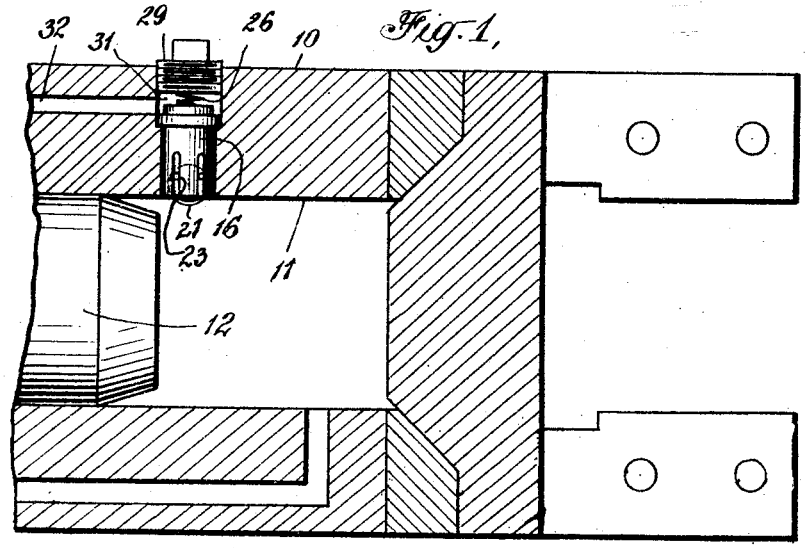
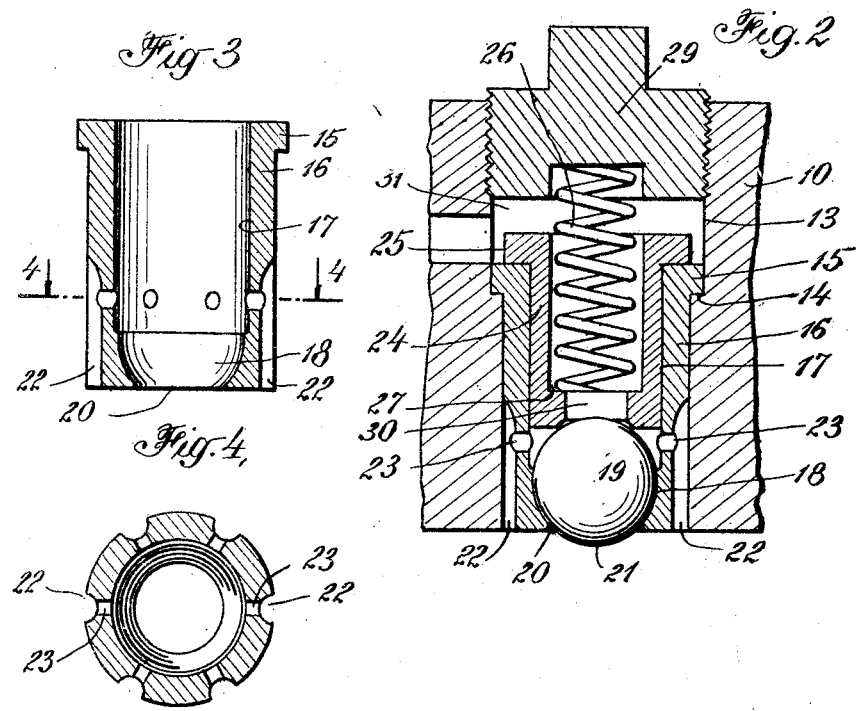
INVENTOR
Thomas E. Sturtevant
BY E. W. Marshall
ATTORNEY Aug. 25, 1925.
T. E. STURTEVANT
VALVE MECHANISM
Filed Aug. 5, 1921
1,550,756
2 Sheets-Sheet 2
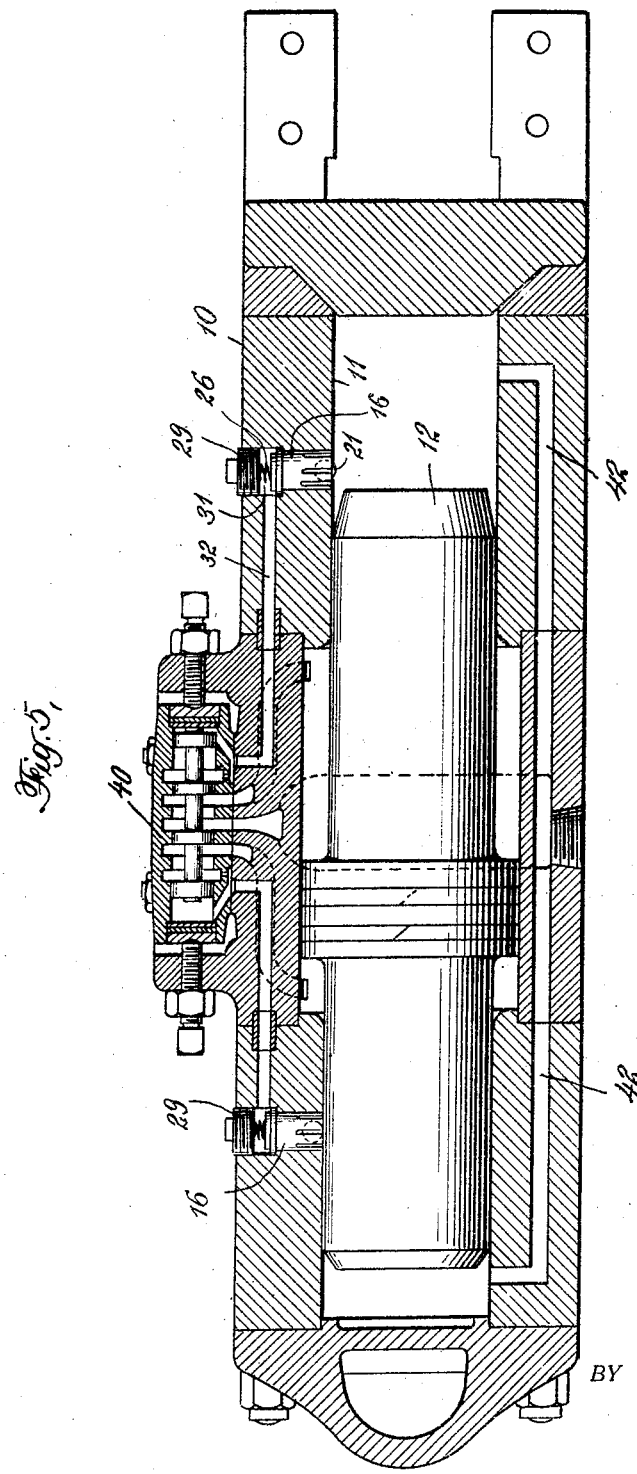
INVENTOR
Thomas E. Sturtevant
BY E. W. Marshall
ATTORNEY

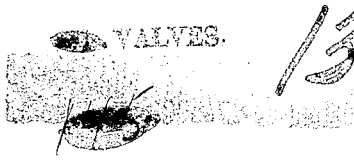

Patented Aug. 25, 1925.

1,550,756

UNITED STATES PATENT OFFICE.

THOMAS E. STURTEVANT, OF DOVER, NEW JERSEY, ASSIGNOR TO McKIERNAN-TERRY DRILL COMPANY, OF DOVER, NEW JERSEY, A CORPORATION OF NEW JERSEY.

VALVE MECHANISM.

Application filed August 5, 1921. Serial No. 490,164.

*To all whom it may concern:*

Be it known that I, THOMAS E. STURTEVANT, a citizen of the United States, and a resident of Dover, county of Morris, and State of New Jersey, have invented certain new and useful Improvements in Valve Mechanisms, of which the following is a specification.

This invention relates to valve mechanism.

In certain types of valve mechanism such, for instance, as those used in devices using fluid pressure and involving the opening and closing of valve operating ports by the movement of a reciprocating member across the ports the parts become worn with use and cause leakage.

One of the objects of this invention is to provide valve mechanism for such ports having means for automatically compensating for wear.

Another object of the invention is to provide a valve mechanism that will be positive and efficient in action and will preserve its efficiency through a much longer period of service than is possible with the usual constructions.

Other objects of the invention will appear from the following description taken in connection with the drawings which form a part of this application and in which Fig. 1 is a sectional elevation illustrating valve mechanism constructed in accordance with my invention.

Fig. 2 is a detail sectional elevation on an enlarged scale of the valve mechanism.

Fig. 3 is an enlarged sectional elevation of the valve cage.

Fig. 4 is a transverse section taken substantially on line 4—4 of Fig. 3, and Fig. 5 is a sectional elevation on an enlarged scale of a portion of a pile hammer showing the use of valves constructed in accordance with the invention.

The objects above outlined are attained in the embodiment of the invention illustrated by providing in a valve a movable valve seat automatically retained in a position to be engaged by the valve during its closing movement and yieldably held in engagement with the valve when the latter is in closed position.

Referring to the drawings, the valve mechanism is illustrated as mounted in a casing 10 communicating with a bore 11 in the casing, in which is mounted a reciprocable piston 12.

As shown at 13, the wall of the casing is bored transversely and is provided with a shoulder 14 upon which seats a flange 15 of a valve cage 16.

The valve cage in the form of the invention shown is substantially cylindrical and is provided with a longitudinal bore 17 and one end of the cage has formed therein a fixed valve seat 18 adapted to receive a valve 19.

In the particular form of the invention illustrated the valve 19 is shown as spherical or in the form of a ball but it should be understood that any other form of valve may be used if desired. The end of the cage 16 which carries the valve is provided with an opening 20 through which the valve extends as shown at 21. The cage 16 has also formed therein at its inner end a plurality of longitudinal grooves 22 which communicate with a plurality of transverse radial openings 23 which connect the grooves with the bore 17 of the valve cage.

A movable valve seat 24 is carried by the cage 16 and has a flange 25 which engages the outer end of the valve cage and limits the movement of the seat in a direction toward the valve 19.

In order to press the movable valve seat in a direction toward the valve a spring 26 is interposed between the inner end of the valve seat and a screw plug 29 which closes the transverse opening 13 in the casing 10. As illustrated the valve seat 24 is hollow or is formed with a bore 27 and at its inner end is provided with a port 30 which is adapted to be closed by the valve 19. As shown in Fig. 1 the bore 27 of the valve seat communicates with a chamber 31 which in turn communicates with a conduit 32 and in the form of the invention shown the conduit 32 is adapted to communicate with a source of air supply.

In Fig. 5 the use of ball valves constructed in accordance with the invention is shown on a pile hammer.

The cylinders are shown at 10 and a control valve chest is shown at 40.

Air is admitted through the valve chest alternately to the oppositely disposed cylinders through conduits 32 and is exhausted from the cylinders through conduits 42 which lead to the valve chest and from the valve chest the air is discharged from a central conduit 43.

The ports in the ball valve are alternately opened and closed by the up and down movement of the piston or ram 12. When the upper or left hand valve in Fig. 5 is closed as illustrated the operating pressure forces the spool valve in the valve chest downwardly or to the right allowing pressure to enter above the piston and allowing the exhaust gas to pass out through the bottom port. As the ram moves to the right or descends the other or bottom valve closes and the top valve opens thereby reversing the direction of movement of the ram.

The valve mechanism above described operates as follows: When the piston 12 engages the valve 19 it forces the valve away from the fixed seat 18 and into engagement with the movable valve seat 24, and the movable valve seat is so positioned that the valve 19 engages this seat before the valve completes its movement and therefore each time that the valve 19 is closed it will move the valve seat 24 in the cage 16 and against the pressure of the spring 26. This will insure the proper seating of the valve and the proper closing each time the valve is actuated, and any wear on the valve 19 will be automatically compensated for by the resiliently actuated movable valve seat 24. The air or other medium controlled by the valve mechanism will pass through the hollow valve seat port 30 and openings 23 and grooves 22 into the bore 11 of the casing when the parts are in their position shown in Fig. 2. When, however, the valve 19 is pressed outwardly by the piston the valve will seat in the movable valve seat and will effectively close the port 30 thereby preventing the passage of the air.

Although one particular embodiment of the invention has been illustrated and described it should be understood that the invention is capable of modification and that changes in the construction and in the arrangement of the various cooperating parts may be made without departing from the spirit or scope of the invention as expressed in the following claims.

What I claim is:

1. Valve mechanism comprising a cage having a fixed valve seat adapted to limit the movement of the valve in one direction, a valve seat movable in said cage and a valve adapted to coact with and seat on each of said valve seats.

2. Valve mechanism comprising a cage having a fixed valve seat adapted to limit the movement of the valve in one direction, a valve seat movable in said cage relative to the fixed seat, a valve adapted to coact with and seat on each of said valve seats and yieldable means for forcing the movable valve seat toward the valve.

3. Valve mechanism including a valve, a fixed valve seat, and a yieldable valve seat spaced from the fixed seat and positioned to be engaged by the valve before the latter is fully closed, and means for pressing the yieldable seat toward the valve and the fixed valve seat.

4. Valve mechanism comprising a valve cage, a hollow, open ended valve seat movable in said cage and having means for limiting its movement in one direction, a fixed valve seat carried by said cage, and a valve confined in said cage between the valve seats and adapted to engage the open end of said movable seat and yieldable means for moving the seat toward the valve.

5. Valve mechanism comprising a valve cage, a hollow, open ended valve seat movable in said cage and having means for limiting its movement in one direction, a fixed valve seat carried by said cage, and a valve confined in said cage between the valve seats and adapted to engage the open end of said movable seat and yieldable means carried by the hollow valve seat for moving the seat toward the valve.

6. Valve mechanism comprising a valve cage, a hollow, open ended valve seat movable in said cage and having means for limiting its movement in one direction, a fixed valve seat carried by said cage, and a valve confined in said cage between the valve seats and adapted to engage the open end of said movable seat and a spring carried by the hollow valve seat for moving the seat toward the valve.

7. Valve mechanism comprising a valve cage, a valve, a fixed valve seat therein adapted to receive the valve when the valve is open, a movable valve seat carried by the cage, yieldable means for moving the movable valve seat toward the valve and means for limiting the movement of said movable valve seat.

8. Valve mechanism comprising a valve cage, a valve, a fixed valve seat therein adapted to receive the valve when the valve is open, a movable valve seat carried by the cage, resilient means for moving the movable valve seat toward the valve and means for limiting the movement of said movable valve seat.

9. Valve mechanism comprising a hollow valve cage, a fixed valve seat at one end, a movable valve seat in the cage, a valve between the fixed and movable seats, a plurality of longitudinal grooves in the outer surface of the cage and openings in the cage communicating with the grooves and with the space between the valve seats.

10. Valve mechanism comprising a hollow valve cage, a fixed valve seat at one end, a resiliently actuated, movable valve seat in the cage, a valve between the fixed and movable seats, a plurality of longitudinal grooves in the outer surface of the cage and openings in the cage communicating with the grooves and with the space between the valve seats.

11. Valve mechanism comprising a valve cage having a fixed valve seat at one end on which the valve is adapted to seat, a valve, a movable valve seat spaced from the fixed seat and having a portion adapted to engage the opposite end of the cage, and having a port adapted to be engaged by the valve, and resilient means for moving the movable seat in a direction toward the valve.

12. Valve mechanism comprising a cylindrical valve cage having a fixed valve seat at one end for limiting the movement of the valve in one direction, a valve adapted to seat on said fixed valve seat, a cylindrical, movable valve seat having a portion adapted to engage the opposite end of the cage and having a port spaced from the fixed valve seat and adapted to be engaged by the valve and resilient means for moving the movable seat in a direction toward the valve.

13. Valve mechanism comprising a valve cage having a fixed valve seat at one end thereof, said seat having an opening through which a portion of the valve is adapted to extend, a movable valve seat carried by the cage, having means engageable therewith to limit the movement of the seat in one direction, resilient actuating means for the seat and conduits in said cage communicating with the interior thereof between the valve and the movable valve seat.

14. A valve cage constructed to form near one of its ends a fixed valve seat, a valve seat slidable within said cage and resiliently pressed toward the fixed valve seat, and a movable valve intermediate said valve seats and arranged to coact with and seat on each of said seats.

15. A valve cage constructed to form near one of its ends a fixed valve seat, a valve seat slidable within the valve cage and resiliently pressed toward the fixed valve seat, means for limiting the movement of said slidable valve seat and a movable valve intermediate said valve seats and arranged to coact with and seat on each of said seats.

In witness whereof, I have hereunto set my hand this 3rd day of August, 1921.

THOMAS E. STURTEVANT.